US010245735B2

(12) United States Patent
Giesen et al.

(10) Patent No.: US 10,245,735 B2
(45) Date of Patent: *Apr. 2, 2019

(54) GLOVEPORT ASSEMBLY AND METHOD OF REPLACING COMPONENTS

(71) Applicant: Delaware Capital Formation, Inc., Wilmington, DE (US)

(72) Inventors: Isaac M. Giesen, Red Wing, MN (US); Joseph David Copley, Shakopee, MN (US)

(73) Assignee: Delaware Capital Formation, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/886,038

(22) Filed: Feb. 1, 2018

(65) Prior Publication Data

US 2018/0297217 A1   Oct. 18, 2018

Related U.S. Application Data

(63) Continuation of application No. 14/987,518, filed on Jan. 4, 2016, now Pat. No. 9,884,428.

(Continued)

(51) Int. Cl.
*A61L 2/02* (2006.01)
*B25J 21/02* (2006.01)
*A47B 81/00* (2006.01)

(52) U.S. Cl.
CPC .............. *B25J 21/02* (2013.01); *A47B 81/00* (2013.01)

(58) Field of Classification Search
CPC ...................................................... B25J 21/02

(Continued)

(56) References Cited

U.S. PATENT DOCUMENTS 4,010,588 A   3/1977   Eisert
4,141,609 A   2/1979   Eisert
(Continued)

FOREIGN PATENT DOCUMENTS

EP   0720895   7/1996
JP   2000193788   7/2000
WO   2016112033   7/2016

OTHER PUBLICATIONS

"AD System; Glove and Accessory Change System," AD System Principle and Installation. la Calhène 2009 (2 pages).

(Continued)

*Primary Examiner* — Matthew W Ing
(74) *Attorney, Agent, or Firm* — Pauly, DeVries Smith & Deffner LLC

(57) ABSTRACT

A replacement glove assembly has a replacement access element defining an outermost shoulder end and an innermost hand end configured to receive a hand of a user. A replacement sealing assembly engages the outermost shoulder end of the replacement access element and defines a leading radial face defining a first coupling structure, a trailing radial face defining a second coupling structure, and an outer annular surface configured to be received by a glove port. A first glove cap has a first side and a second side opposite the first side. The first side defines a first mating structure sealably engaged with the first coupling structure of the leading radial face. The second side defines a second mating structure that is configured to sealably engage the second coupling structure of the trailing radial face of the replacement sealing assembly.

8 Claims, 11 Drawing Sheets

Related U.S. Application Data

(60) Provisional application No. 62/099,817, filed on Jan. 5, 2015.

(58) Field of Classification Search
USPC .................................................... 312/1, 3
See application file for complete search history.

(56) References Cited

U.S. PATENT DOCUMENTS

| | | | |
|---|---|---|---|
| 4,201,310 | A | 5/1980 | Glachet et al. |
| 5,090,782 | A | 2/1992 | Glachet et al. |
| 5,662,581 | A | 9/1997 | Jennrich et al. |
| 7,282,176 | B2 | 10/2007 | Glachet et al. |
| 7,325,890 | B2 | 2/2008 | Oyama et al. |
| 7,780,248 | B2 | 8/2010 | Granadino et al. |
| 8,220,675 | B2 | 7/2012 | Rohard et al. |
| 8,298,054 | B2 | 10/2012 | Hodge et al. |
| 8,887,365 | B2 | 11/2014 | Giesen et al. |
| 9,884,428 | B2 | 2/2018 | Giesen et al. |
| 2008/0217366 | A1 | 9/2008 | Rohard et al. |
| 2015/0059144 | A1 | 3/2015 | Fournier et al. |
| 2015/0243392 | A1 | 8/2015 | Fournier |
| 2016/0193736 | A1 | 7/2016 | Giesen |

OTHER PUBLICATIONS

"Enclosure System Operating Principle," Central Research Laboratories, http://www.centres.com/nuclear/encl/encloper.htm; retrieved Apr. 14, 2008 (2 pages).

"International Preliminary Report on Patentability," for PCT Application No. PCT/US2016/012219 dated Jul. 20, 2017 (10 pages).

"International Search Report and Written Opinion," for PCT Application No. PCT/US2016/012219, dated Apr. 18, 2016 (14 pages).

"Non-Final Office Action," for U.S. Appl. No. 14/987,518 dated Jun. 15, 2017 (12 pages).

"Notice of Allowance," for U.S. Appl. No. 14/987,518 dated Sep. 27, 2017 (8 pages).

"Pharmaceutical Glove System," Central Research Laboratories, http://www.centres.com/pharm/glove/pharmglv.htm; retrieved Apr. 2, 2008 (2 pages).

"Push-Through Glove Systems; Proven Technology for Containment of Hazardous Environments," Central Research Laboratories Product Catalog, Feb. 2006 (20 pages).

Rael, G. D. et al., "Retrofit of an Engineered Gloveport to a Los Alamos National Laboratory's Plutonium Facility Glovebox," WM2008 Conference, Los Alamos National Laboratory, Los Alamos, NM, Feb. 2008 (9 pages).

"Response to Communication Pursuant to Rules 161(1) and 162 EPC," for European Patent Application No. 16702224.3 filed with the EPO dated Mar. 13, 2018 (51 pages).

"Response to Non Final Office Action," for U.S. Appl. 14/987,518, filed Sep. 15, 2017 (9 pages).

"Sealed Pass-Through Enclosure System," Central Research Laboratories, http://www.hellotrade.com/central-research-laboratories/sealed-pass-through-enclosure-system.html; retrieved Apr. 3, 2008 (1 page).

GLOVEPORT ASSEMBLY AND METHOD OF REPLACING COMPONENTS

This application is a continuation of U.S. Provisional application Ser. No. 14/987,518 filed Jan. 4, 2016, which is a non-provisional application claiming priority to U.S. Provisional Application No. 62/099,817 filed Jan. 5, 2015, and the entire contents of the U.S. Provisional Application are incorporated herein by reference.

FIELD OF THE TECHNOLOGY

The field of technology relates to replacement of glove box components such as gloves in an efficient manner without breaking containment.

BACKGROUND

In various industries it is preferable to work, test, assemble, and the like, in an environment that is isolated from normal ambient conditions. For example, it can be preferable for such activities to be contained in a substantially dirtier environment than the ambient conditions, such as hot cells or laboratories, so inside waste does not substantially affect conditions on the outside. In other examples, such as medical and pharmaceutical applications, it may be preferable for activities to occur in a substantially cleaner environment, where outside debris and bacteria cannot substantially affect conditions in the clean environment. A sealed glove system facilitates the performance of work within an enclosure by an operator outside of the enclosure in extending a hand and arm through a glove sealed in a port in a barrier wall of the enclosure.

Gloves for remote handling of substances within a glove box are wear parts. Constant flexing of a glove by the user will naturally cause leakage if not replaced according to a regular maintenance schedule. Also, occasionally gloves will fail prematurely. The replacement process in these systems shuts down production and utilizes costly labor. Replacement in these systems can also be made safer by reducing the occurrence of a glove breach causing contamination of the area outside the glovebox. What is needed is a glove replacement system that allows for glove servicing that can be accomplished by potentially only one person, and a quicker, easier, cleaner, safer, and less costly replacement process.

BRIEF DESCRIPTION OF THE DRAWINGS

The current technology may be more completely understood and appreciated in consideration of the following detailed description of various embodiments of the current technology in connection with the accompanying drawings.

DETAILED DESCRIPTION

Figure 1:
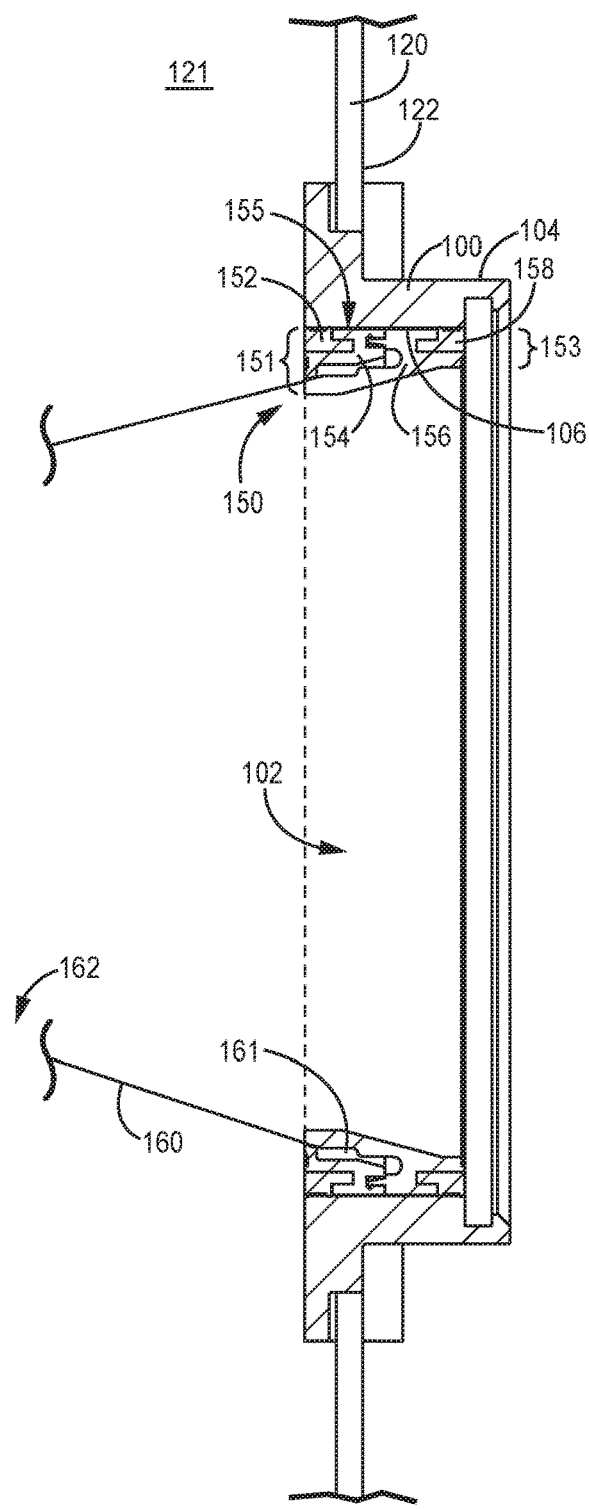
FIG. 1 is a cross-sectional view of a gloveport having a glove.

FIG. 1 is a cross-sectional view of a gloveport having a glove. A glovebox wall 120 separates the glovebox side 121 of the wall from the outside surface 122 of the glovebox. An annular port ring 100 is present in a port opening 102 of the glovebox wall 120. An access element disposed in the annular port ring 100 is configured to provide a user with access to the inside of the glovebox through the glovebox wall 120. In the current embodiment, the access element is a glove 160. The presence of the glove 160 provides access to the glovebox side 121 of the glovebox wall 120 without contamination of either the outside of the glovebox from the glovebox side 121 of the wall or of the glovebox side 121 of the wall from the outside of the glovebox. The annular port ring 100 is generally cylindrical and extends at least partially through the port opening 102 defined by the thickness of the glovebox wall 120, and defines an outer annular surface 124 extending beyond the outside surface 122 of the glovebox wall 120. The annular port ring 100 also defines an inner annular surface 106.

The annular port ring can comprise a variety of materials, any of which are currently used in the art such as stainless steel, aluminum, plastics, and so on. Commonly a 300 series stainless steel is used. The inner annular surface 106 of the annular port ring 100 can define one or more grooves (not shown) that are configured to receive o-rings to define one or more additional sealing structures.

The access element, which is a glove 160 in the current embodiment, has an outermost shoulder end 161 and in innermost hand end 162 that is configured to receive the hand of a user through an opening on the outermost shoulder end 161. In at least one embodiment, the glove 160 comprises a substantially impermeable flexible material such as neoprene. The outermost shoulder end 161 of the glove 160 is sealably secured to the inner annular surface 106 of the annular port ring 100 with a gloveport sealing assembly 150.

The gloveport sealing assembly 150 engages the outermost shoulder end 161 of the glove 160. The gloveport sealing assembly 150 generally defines a leading radial face 151, a trailing radial face 153, and an outer annular surface 155 that is configured to be received by a gloveport. The term "leading" is used to refer to the surface(s) of the relevant component/assembly that is configured to be inserted first towards the annular port ring from the outside of the glovebox wall 120 towards the glovebox. The term "trailing" is used to refer to the opposite surface(s) of the component/assembly that is configured to follow the leading face. In a number of embodiments, the outer annular surface 155 of the gloveport sealing assembly 150 is configured to form a seal with the inner annular surface 106 of the annular port ring 100.

In the current embodiment, the gloveport sealing assembly 150 has an inner support ring 154 and an outer support ring 156 that mutually engages the outermost shoulder end 161 of the glove 160 there-between. The inner support ring 154 and the outer support ring 156 are generally configured to mechanically engage and seal the outermost shoulder end 161 of the glove 160, which can be accomplished through a variety of structural configurations. In a variety of embodiments the inner support ring 154 and the outer support ring 156 are separate components, and in a variety of some other embodiments the inner support ring 154 and the outer support ring 156 are a single component. An o-ring can be disposed between the inner support ring 154 and the outer support ring 156 to define a seal with the outermost shoulder end 161 of the glove 160. In some embodiments no o-ring is disposed between the inner support ring 154 and the outer support ring 156.

The gloveport sealing assembly 150 has one or more gaskets 152, 158 that are configured to create a seal between the glovebox and the outside environment at the juncture(s) between the inner annular surface 106 of the annular port ring 100 and one or both of the inner support ring 154 and the outer support ring 156. In the current embodiment, an outer gasket 158 is sealingly disposed between the outer support ring 156 and the inner annular surface 106 of the annular port ring 100. Similarly, an inner gasket 152 is sealingly disposed between the inner annular surface 106 of the annular port ring 100 and inner support ring 154. In some embodiments, the inner gasket 152 and the outer gasket 158 are separate components, while in other embodiments the inner gasket 152 and the outer gasket 158 can be a single component. In embodiments where the inner gasket 152 and the outer gasket 158 are a single component, the gasket can form a sleeve or a portion of a sleeve over the inner support ring 154 and the outer support ring 156. In some embodiments the inner gasket 152 at least partially defines the leading radial face 151 of the gloveport sealing assembly 150. In some embodiments the outer gasket 158 at least partially defines the trailing radial face 153 of the gloveport sealing assembly 150. One or more o-rings can additionally be used between components in the gloveport sealing assembly 150, such as between the inner support ring 154 and the outer support ring 156.

Figure 2:
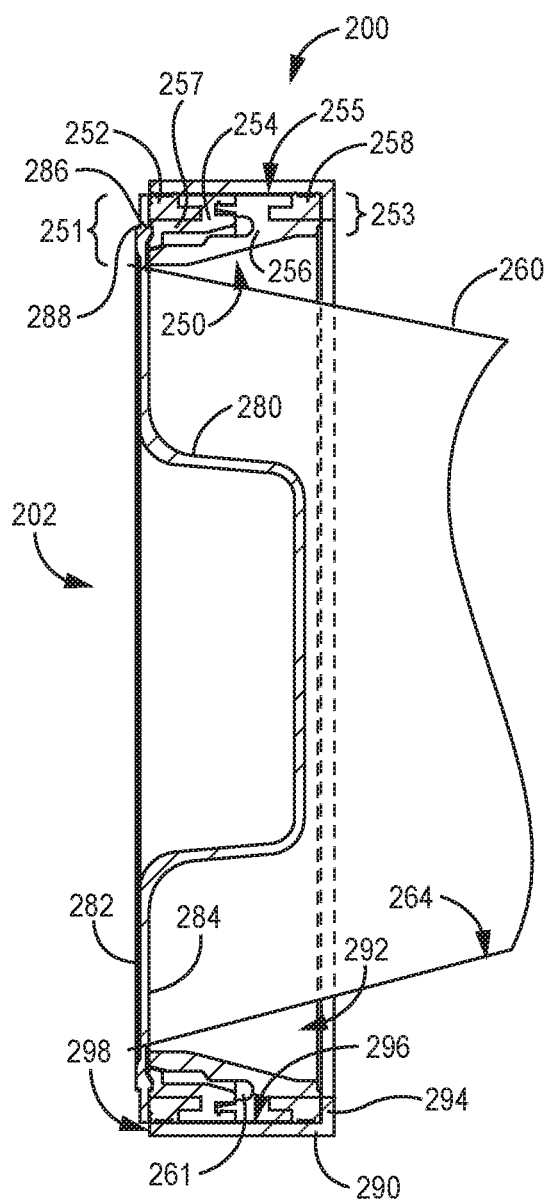
FIG. 2 is a cross-sectional view of a replacement glove assembly.

FIG. 2 depicts a replacement glove assembly 200 consistent with the technology disclosed herein. The replacement glove assembly 200 is configured to replace an access element in a gloveport, such as those consistent with the gloveport depicted in FIG. 1. The replacement glove assembly 200 has a replacement glove 260 and a replacement sealing assembly 250 that sealably engages an outermost shoulder end 261 of the replacement glove 260. Similar to the gloveport sealing assembly discussed above with reference to FIG. 1, the replacement sealing assembly 250 has a leading radial face 251, a trailing radial face 253, and an outer annular surface 255 that is configured to be received by a glove port. More particularly, the replacement sealing assembly 250 has a replacement inner gasket 252 abutting a replacement inner support ring 254, abutting a replacement outer support ring 256, abutting a replacement outer gasket 258, although alternate configurations are certainly contemplated.

A glove cap 280 of the replacement glove assembly 200 isolates the outer surface of the replacement glove 260, which will be exposed to the environment inside the glovebox, from the environment outside the glovebox. The glove cap 280 generally has a first side 282 and a second side 284 opposite the first side 282, where the first side 282 can be the leading side and the second side 284 can be the trailing side. The second side 284 of the glove cap 280 can be sealably engaged with the leading radial face 251 of the replacement sealing assembly 250 in a variety of embodiments. In a number of embodiments, the second side 284 of the glove cap 280 defines a first mating structure 286 and the leading radial face 251 of the replacement sealing assembly 250 defines a first coupling structure 257, where the first mating structure 286 and the first coupling structure 257 are configured to mutually sealably engage. In at least one embodiment the first side 282 of the glove cap 280 forms a snap-fit connection with the leading face of the replacement sealing assembly 250, such as with the replacement inner support ring 254, to seal the outer surface 264 of the replacement glove 260 from the environment. In at least one other embodiment, the first side 282 of the glove cap 280 forms a bayonet connection with the leading radian face 251 of the replacement sealing assembly 250.

An outer sleeve 290 is generally configured to protect the outer annular surface 255 of the replacement sealing assembly 250 from the environment outside the glovebox, where the outer annular surface 255 of the replacement sealing assembly 250 is configured to be received by the inner annular surface 106 of the annular port ring 100 (See FIG. 1). The outer sleeve 290 can be in sealing engagement with the outer annular surface 255 of the replacement sealing assembly 250. The outer sleeve 290 generally defines an inner annular surface 296 that is configured to sealably receive the outer annular surface 255 of the replacement sealing assembly 250. The outer sleeve 290 can form a sealed, frictional fit with one or more outer annular surfaces of the replacement sealing assembly 250. For example, in one embodiment the outer sleeve 290 forms a sealed, frictional fit, such as an interference fit, with the replacement inner gasket 252 and the replacement outer gasket 258.

The outer sleeve 290 generally defines a leading radial face 298 and an opening 292 central to the leading radial face 298 that is configured to accommodate the replacement sealing assembly 250. The opening 292 can generally be central relative to the outer sleeve 290. The outer sleeve 290 defines a radial lip 294 extending inward from the inner annular surface 296 of the outer sleeve 290 to abut the trailing radial face 253 of the replacement sealing assembly 250. Generally the radial lip 294 of the outer sleeve 290 exposes at least a portion of the trailing radial face 253 of the replacement sealing assembly 250. In some alternate embodiments the outer sleeve 290 does not define such a radial lip 294. In various embodiments the outer sleeve 290 is configured to allow the replacement sealing assembly 250 to translate out of the outer sleeve 290 in at least one direction.

Generally the surfaces of the replacement glove assembly 200 will be sterilized prior to use, particularly those surfaces that are configured to be eventually exposed to the environment inside of the glovebox, such as outer surface 264 of the replacement glove 260 and the second side 284 of the glove cap 280, which will be described in more detail below. Also, typically the outer annular surface 255 of the replacement sealing assembly 250, which is configured to abut the inner annular surface of an annular port ring (see FIG. 1, for example), and the inner annular surface of the outer sleeve 290 will also be sterilized to minimize risk for contamination of the annular port ring.

In some embodiments, however, the replacement glove assembly 200 does not have an outer sleeve 290. Such embodiments can be preferable in situations where the outer annular surface 255 of the replacement sealing assembly 250 will be sterilized prior to insertion in an annular port ring. Such embodiments can also be preferable in situations where the glovebox is contaminated relative to the outside environment, so there is little risk of outside environment contaminating the contents of the glovebox.

Figure 3:
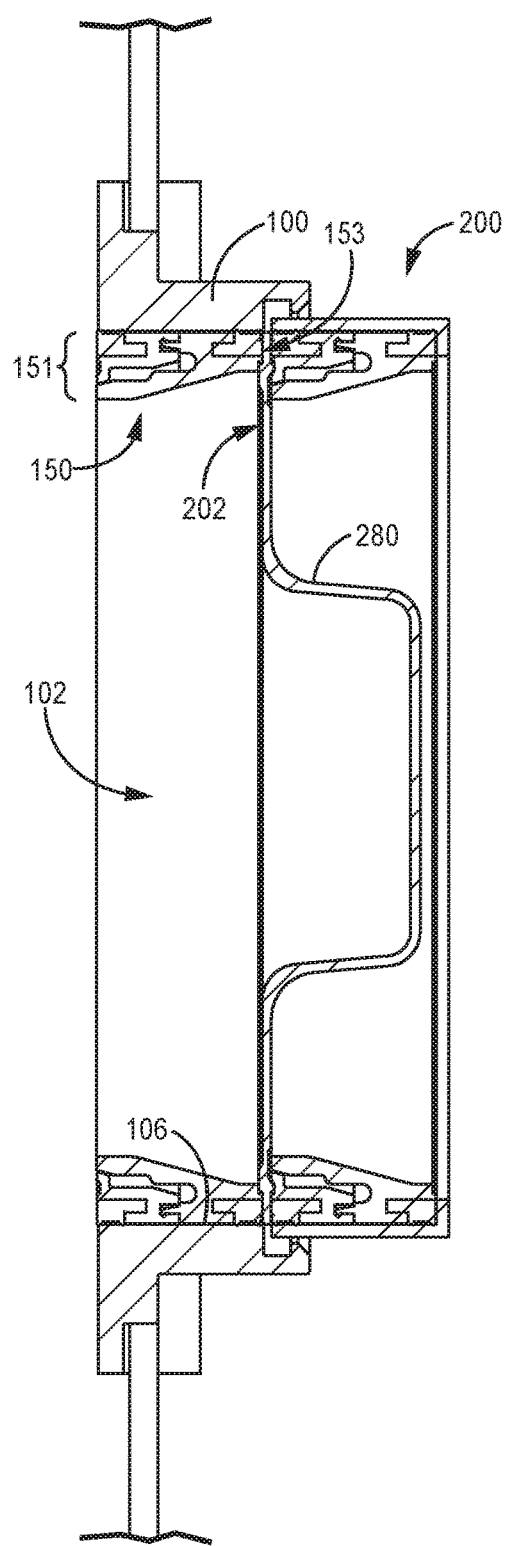
FIG. 3 is a cross-sectional view of one step in a method consistent with the technology disclosed herein.

Now the process of installing the replacement glove assembly 200 and removing the original glove (See FIG. 1) will be described with reference to FIGS. 3-6. Turning to FIG. 3 (the replacement glove 260 is omitted from this particular figure for clarity), the leading face 202 of the replacement glove assembly 200 is positioned in the port opening 102 in the outermost end (relative to the glovebox) of the annular port ring 100 to abut the original gloveport sealing assembly 150. The leading face 202 of the replacement glove assembly 200, a substantial portion of which is defined by a glove cap 280, is aligned with the trailing radial face 153 of the original gloveport sealing assembly 150 that is disposed in the annular port ring 100. In some embodiments, including the one depicted, the leading radial face 298 of the outer sleeve 290 (which partially defines the leading face 202 of the replacement glove assembly) is partially inserted in the annular port ring 100 to align the leading face 202 of the replacement glove assembly 200 with the trailing radial face 153 of the original gloveport sealing assembly 150.

Figure 4A:
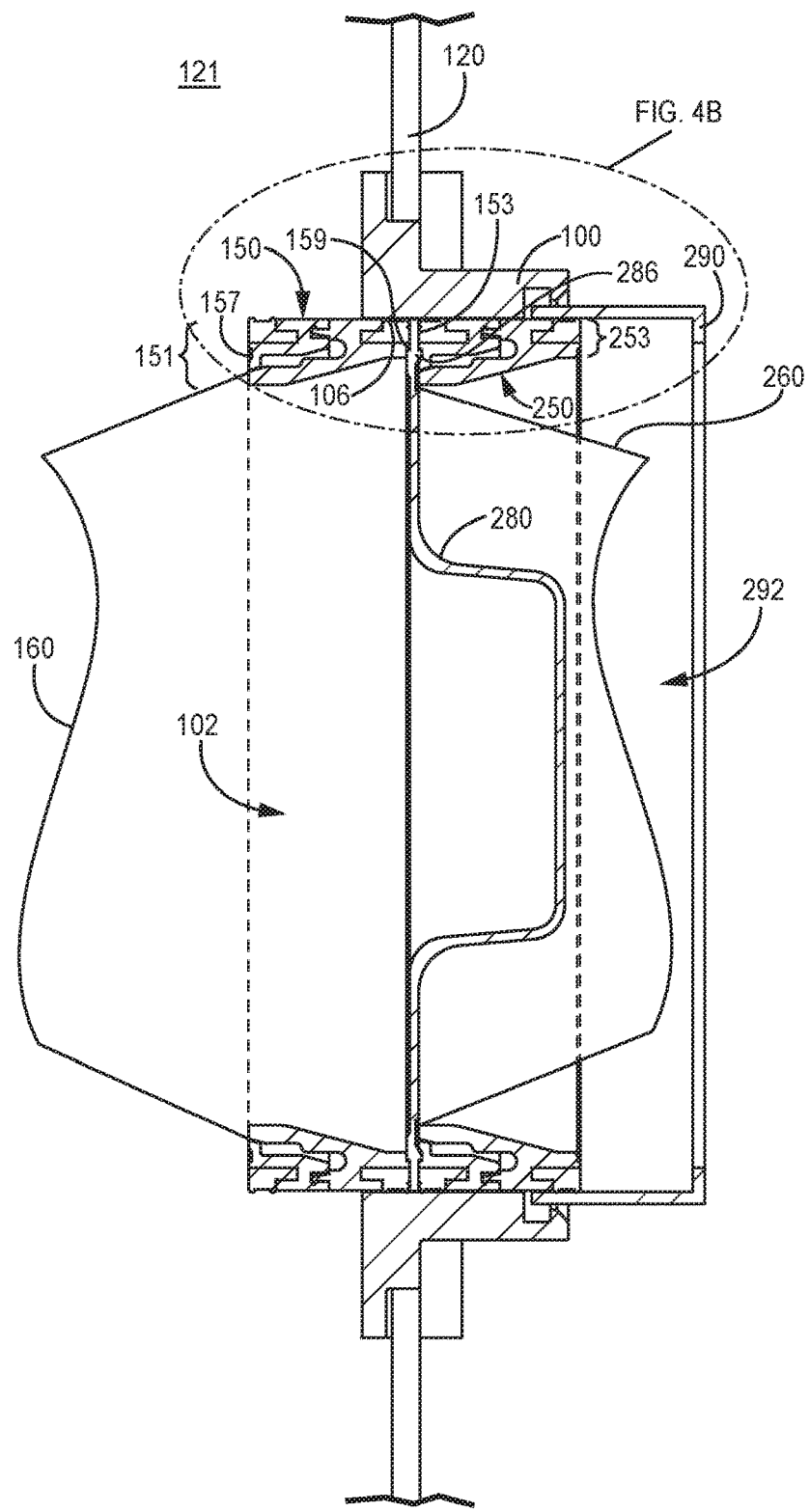
FIG. 4A is a cross-sectional view of another step in a method consistent with the technology disclosed herein.
Figure 4B:
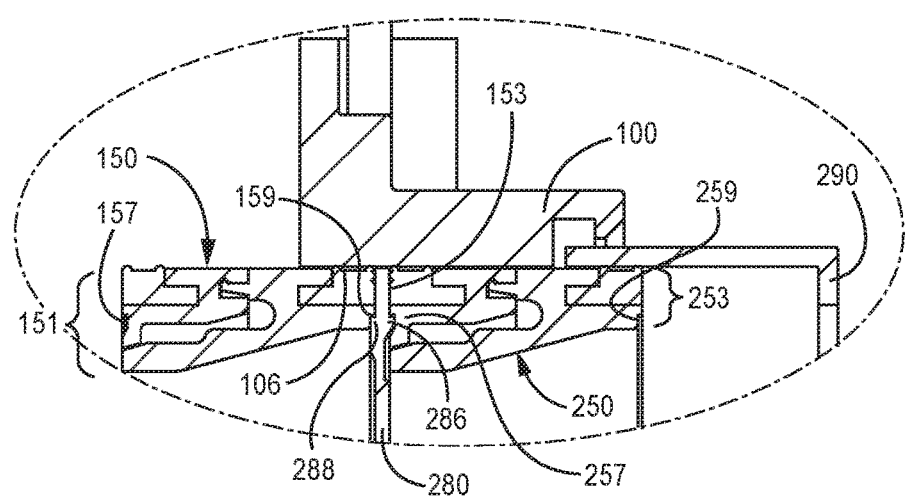
FIG. 4B is a detail view of FIG. 4A.

In FIGS. 4A and 4B the replacement glove 260, the replacement sealing assembly 250, and the glove cap 280 are pushed partially through the annular port ring 100. In at least one embodiment, such components are manually pushed through the annular port ring 100 through an opening 292 defined by the outer sleeve 290. In another embodiment a tool is used to push the relevant components through the annular port ring 100. In a variety of embodiments, pushing pressure is applied to the at least a portion of the trailing radial face 253 of the replacement sealing assembly 250 to push the replacement glove 260, replacement sealing assembly 250 and the glove cap 280 towards the glovebox side 121 of the glovebox wall 120 through the annular port ring 100.

A structural interference mutually defined by the outer sleeve 290 and the inner annular surface 106 of the annular port ring 100 prevents progression of the outer sleeve 290 through the port opening 102. As such, progression of the replacement glove 260, the replacement sealing assembly 250, and the glove cap 280 through the annular port ring 100 results in removal of the outer sleeve 290 from the sealing surface of the replacement sealing assembly 250. When the replacement sealing assembly 250 translates out from the outer sleeve 290 into the annular port ring 100, the replacement sealing assembly 250 is configured to form a seal with the inner annular surface 106 of the annular port ring 100.

The glove cap 280 is generally transferred from the replacement sealing assembly 250 to the original gloveport sealing assembly 150. As such, the glove cap 280 is coupled to the trailing radial face 153 of the original gloveport sealing assembly 150. While it has been described above that the second side 284 of the glove cap 280 defines a first mating structure 286 that sealably engages that first coupling structure 257 of the replacement glove assembly 200. The glove cap 280 further defines a second mating structure 288 on its first side 282 that is configured to sealably engage a second coupling structure 159 defined by the trailing radial face 153 of the original gloveport sealing assembly 150 (See FIG. 4B).

Because the original gloveport sealing assembly 150 and the replacement sealing assembly 250 are generally configured to be structurally similar, if not identical, it follows that the trailing radial face 253 of the replacement sealing assembly 250 also defines a second coupling structure 259 that is configured to sealably engage the second mating structure 288 defined by the first side 282 of the glove cap 280, as well as second mating structures defined by the first side of other glove caps of other replacement glove assemblies. It also follows that the leading radial face 151 of the original gloveport sealing assembly 150 defines a first coupling structure 157 that is configured to sealably engage the first mating structure 286 defined by the second side 284 of the glove cap 280.

In some embodiments, upon pushing the replacement glove 260, the replacement sealing assembly 250, and the glove cap 280 through the annular port ring 100, the leading face, or first side 282, of the glove cap 280 sealably engages the trailing radial face 153 of the original gloveport sealing assembly 150. The seal could be formed via a snap fit, as one example embodiment. In another embodiment, the leading face that is the first side 282 of the glove cap 280 mates with the trailing radial face 153 of the original gloveport sealing assembly 150 by another means, such as through a bayonet connection, for example. In such an example, the glove cap 280 would sealably engage the trailing radial face 153 of the gloveport sealing assembly 150 by rotation the glove cap 280 relative to the gloveport sealing assembly 150.

Figure 5:
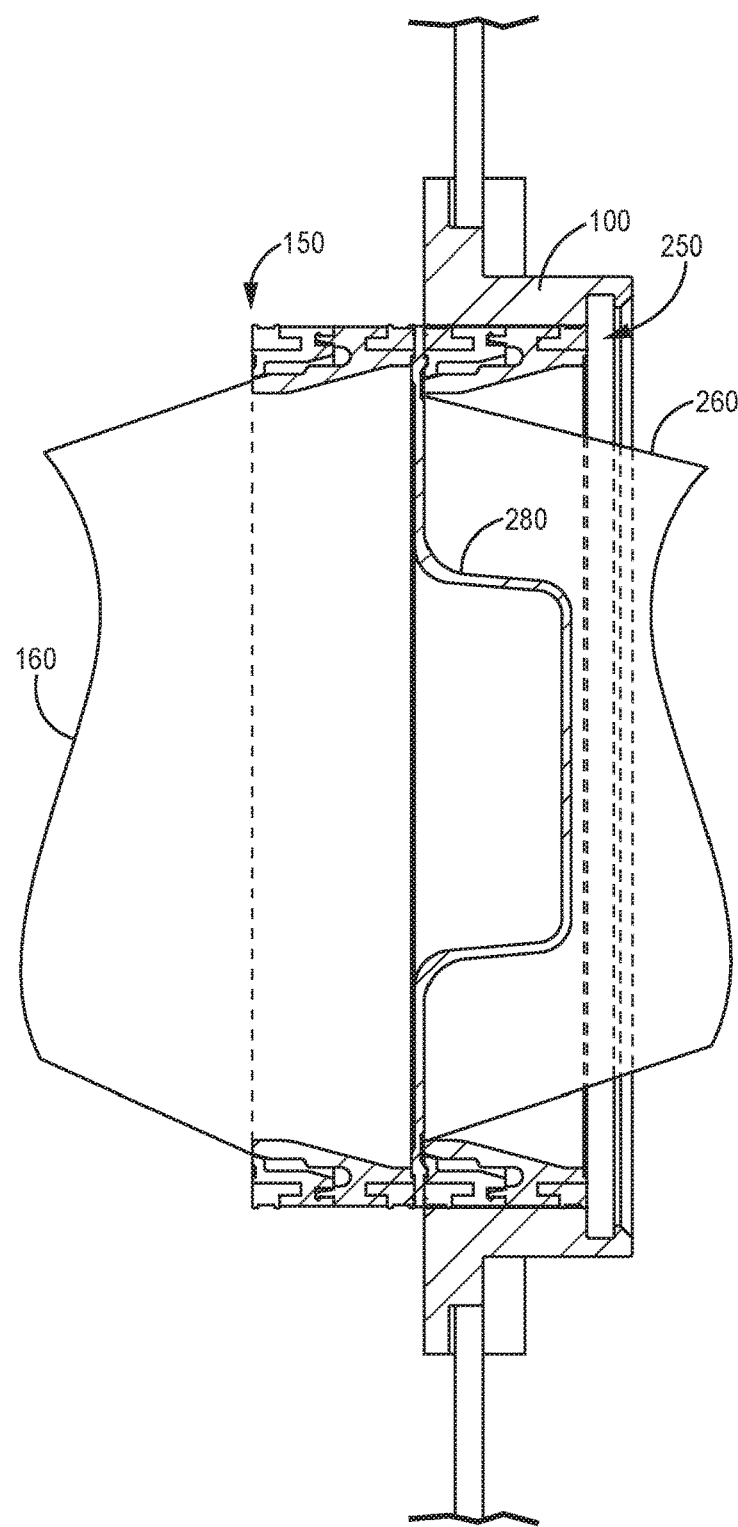
FIG. 5 is a cross-sectional view of yet another step in a method consistent with the technology disclosed herein.

Referring to FIG. 5, the outer sleeve (not currently depicted) can be removed and the remaining components of the replacement glove assembly are further progressed through the annular port ring 100 into the proper position. In some embodiments, the proper position is achieved when the leading radial face 251 of the replacement sealing assembly 250 is substantially aligned with a leading face of the annular port ring 100. At this point the original glove 160 and the original gloveport sealing assembly 150 are substantially removed from the annular port ring 100, and both of the trailing radial face 151 of the original gloveport sealing assembly 150 and the leading radial face 251 of the replacement sealing assembly 250 are coupled to the glove cap 280.

Figure 6:
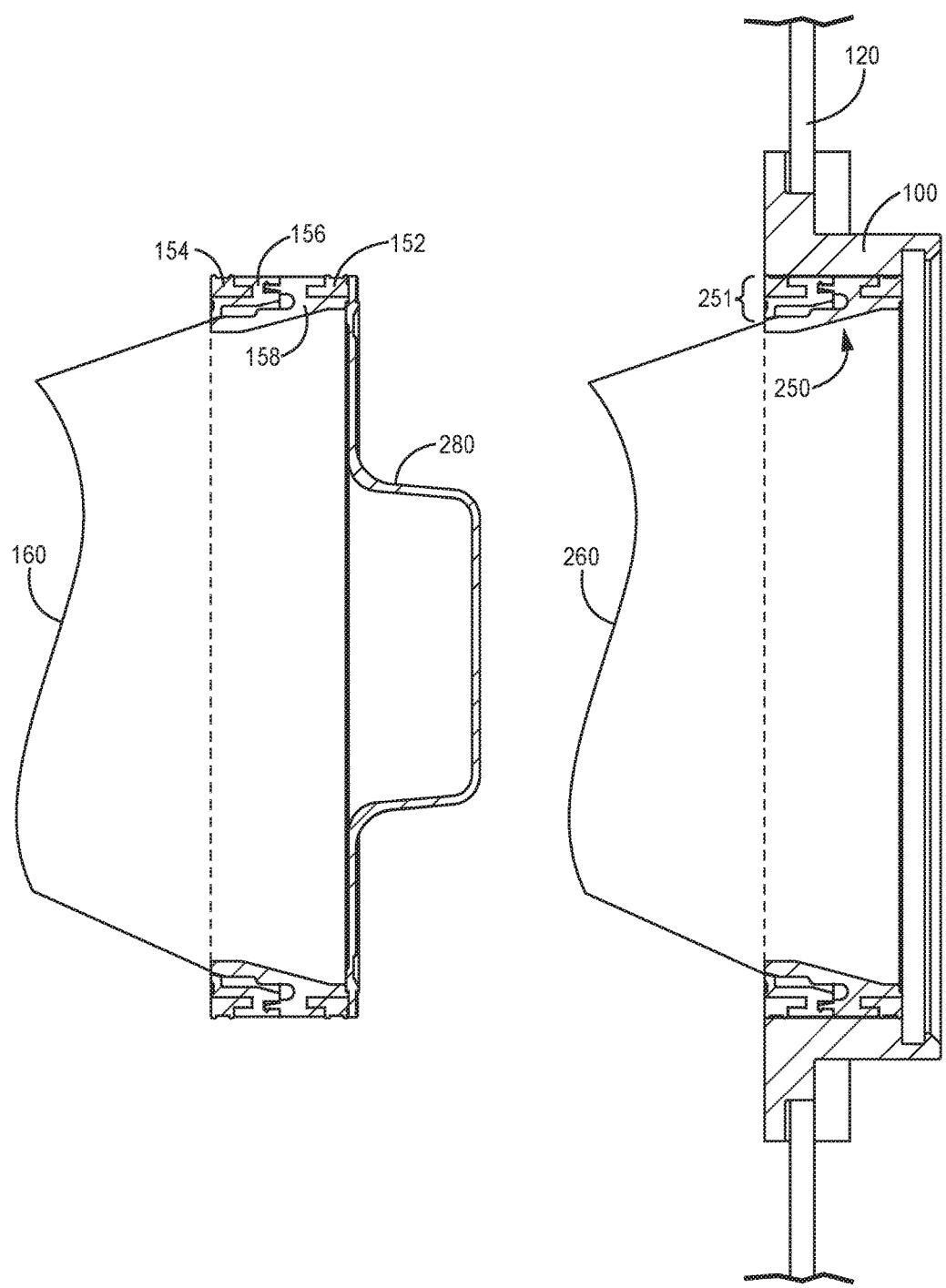
FIG. 6 is a cross-sectional view of yet another step in a method consistent with the technology disclosed herein.

Referring to FIG. 6, the glove cap 280 is disconnected from the leading radial face 251 of the replacement sealing assembly 250 and the outer surface of the replacement glove 260 is exposed to the environment inside the glovebox. In various embodiments the replacement glove 260 is ready for use. In some embodiments the glove cap 280 is released from the leading face of the replacement sealing assembly 250 by manually pushing on the glove cap 280 away from the replacement sealing assembly 250. In such an embodiment a user can insert his/her hand in the replacement glove 260, for example, to push the glove cap 280 away from the replacement sealing assembly 250. In another embodiment the glove cap 280 is released from the leading face of the replacement sealing assembly 250 by rotating the glove cap 280 relative to the leading face of the replacement sealing assembly 250.

Transferring the glove cap 280 from the replacement sealing assembly 250 to the original gloveport sealing assembly 150 allows the replacement access element, such as the replacement glove 260 to be used. Transferring the glove cap 280 to original gloveport sealing assembly 150 isolates the inner surface of the original glove 160 and the inner annular surface of the original outer support ring 156—which were previously exposed to the environment outside the glovebox—from the inside environment of the glovebox to prevent contamination.

Figure 7:
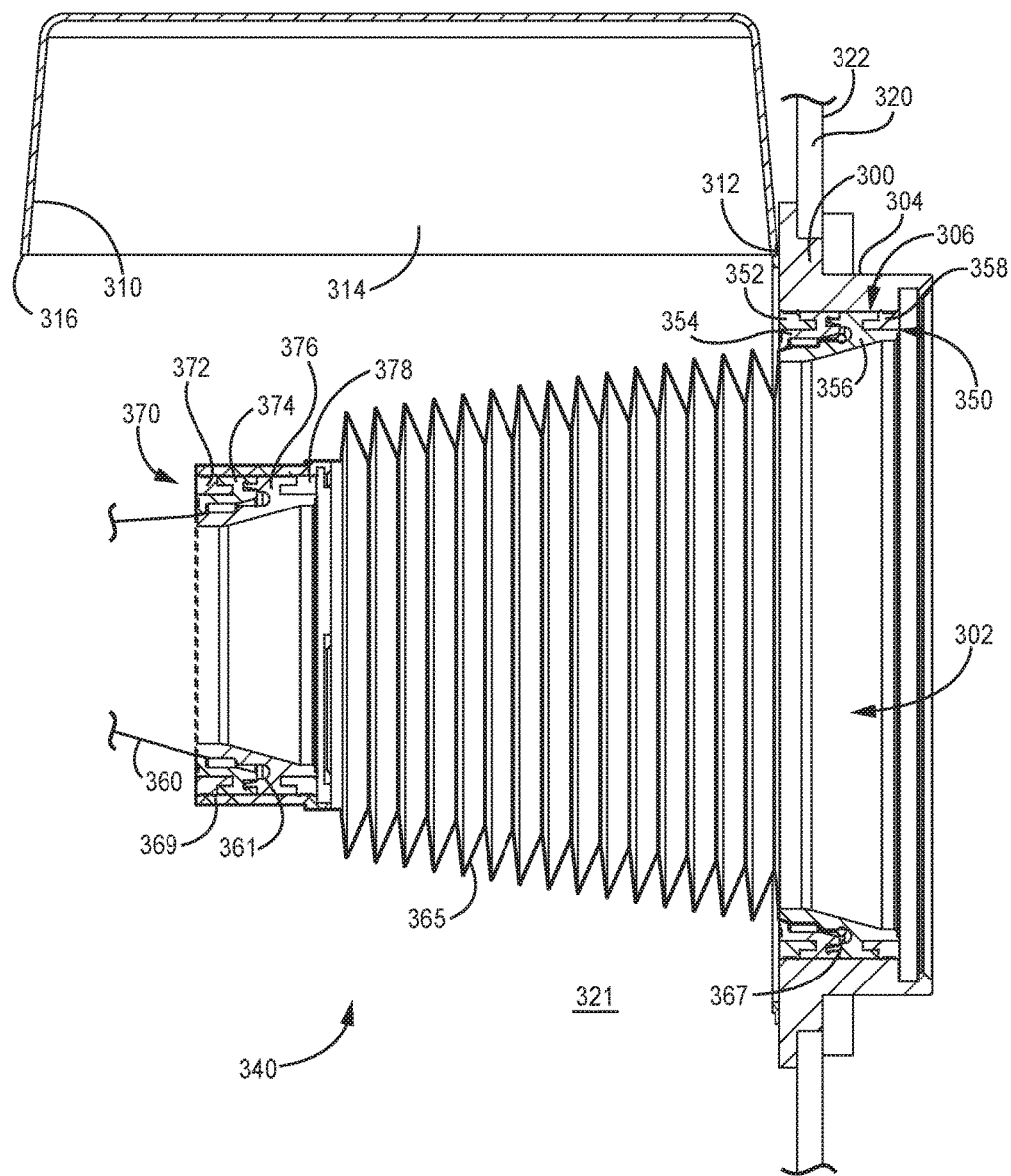
FIG. 7 is a cross-sectional view of a gloveport having an alternate glove assembly configuration consistent with the technology disclosed herein.

FIG. 7 depicts a cross-sectional view of a gloveport having an alternate glove assembly configuration consistent with the technology disclosed herein. A glovebox wall 320 separates the glovebox side 321 of the wall from the outside surface 322 of the glovebox. An annular port ring 300 is disposed in a port opening 302 defined by the glovebox wall 320. An access element 340 having a glove 360 is sealably coupled to the annular port ring 300 through a number of components which will be described below. The access element 340 provides access to the glovebox side 321 of the glovebox wall 320. The annular port ring 300 can be similar to that described above with respect to FIGS. 1-6, as it is generally cylindrical and extends at least partially through the port opening 302 defined by the glovebox wall 320. The annular port ring 300 defines an outer annular surface 304 and an inner annular surface 306.

In the current embodiment, a port cover 310 is pivotably disposed to be in sealable communication with the annular port ring 300 over the port opening 302. FIG. 10 depicts the port cover 310 in a closed position, and can be referenced in conjunction with FIG. 7 for purposes of this description. The port cover 310 is generally configured to selectably isolate the access element 340 disposed in the annular port ring 300 from activity and substances in the glovebox, such as to shield the access element 340 from debris when the access element 340 is not in use. The port cover 310 has a hinge 312 in the current embodiment, but in some embodiments other structures can be used in conjunction with the port cover 310 to selectively seal the access element 340 from the glovebox about the annular port ring 300. The port cover 310 defines a sealing surface 316 that is configured to form a seal against the annular port ring 300. The port cover 310 defines a cavity 314 defined within the sealing surface 316 that is configured to accommodate the access element. The sealing surface 316 can be a radial surface in some embodiments. It will be appreciated that embodiments consistent with FIGS. 1-6 could have a port cover, and that embodiments generally consistent with FIGS. 7-9 could lack a port cover without deviating from the scope of the current technology.

Returning to FIG. 7, the access element 340 is generally consistent with the descriptions above with respect to FIGS. 1-6 in that the glove 360 is sealably coupled to the annular port ring 300. In the current embodiment however, the glove 360 is sealably coupled to a sleeve 365, and the sleeve 365 is sealably coupled to the annular port ring 300. As such, the access element 340 is a combination of the glove 360, a glove sealing element 370 that sealably couples the glove to the sleeve 365, and the sleeve 365. The glove 360, the glove sealing element 370, and the sleeve 365 are mutually configured to accommodate the hand and arm of a user such that the user can access the glovebox through the glovebox wall 320. In some embodiments it can be desirable to incorporate the access element 340 currently depicted in a glove port consistent with FIGS. 1-6, and incorporate the glove associated with FIGS. 1-6 in the currently depicted glove port.

The sleeve 365 can have a variety of configurations, but in the current embodiment the sleeve 365 defines a tubular accordion shape that extends between an outermost shoulder end 367 and a second sleeve end 369. The outermost shoulder end 367 is sealably coupled to a gloveport sealing assembly 350 and the second sleeve end 369 defines a cuff that is configured to sealably receive the glove sealing element 370. The glove sealing element 370 sealably receives an outermost shoulder end 361 of the glove 360.

The gloveport sealing assembly 350 can be similar to the gloveport sealing assembly 150 described above with respect to FIGS. 1-6. The outermost shoulder end 367 of the access element 340, which is the first end of the sleeve 365, is sealably secured by the gloveport sealing assembly 350. In this particular embodiment, an inner support ring 354 and an outer support ring 356 of the gloveport sealing assembly 350 sealingly engage the outermost shoulder end 367 of the access element 340. The gloveport sealing assembly 350 can have alternate configurations with which to engage the outermost shoulder end 367 of the access element 340 as well. An outer gasket 358 sealingly engages the outer support ring 356 and the inner annular surface 306 of the annular port ring 300. The gloveport sealing assembly 350 has an inner gasket 352 sealingly engaging an inner support ring 354.

The glove sealing element 370 can be similar to the gloveport sealing assembly 350 described above, except the glove sealing element 370 is configured to form a radial seal with an inner annular surface of the cuff 369 of the sleeve 365. The outermost shoulder end 361 of the glove 360 is sealably secured between an inner support ring 374 and an outer support ring 376 of the glove sealing element 370. One or more glove gaskets 372, 378 are disposed in sealing contact with the cuff 369 and the glove inner support ring 374 and/or the glove outer support ring 376 provide a seal between the glovebox and the environment outside of the glovebox. Alternate configurations will certainly be appreciated. In one example alternate configuration, the outermost shoulder end of the glove is sealably secured to a glove sealing element 370 that couples to the cuff 369 on the outer annular surface of the cuff 369.

Figure 8:
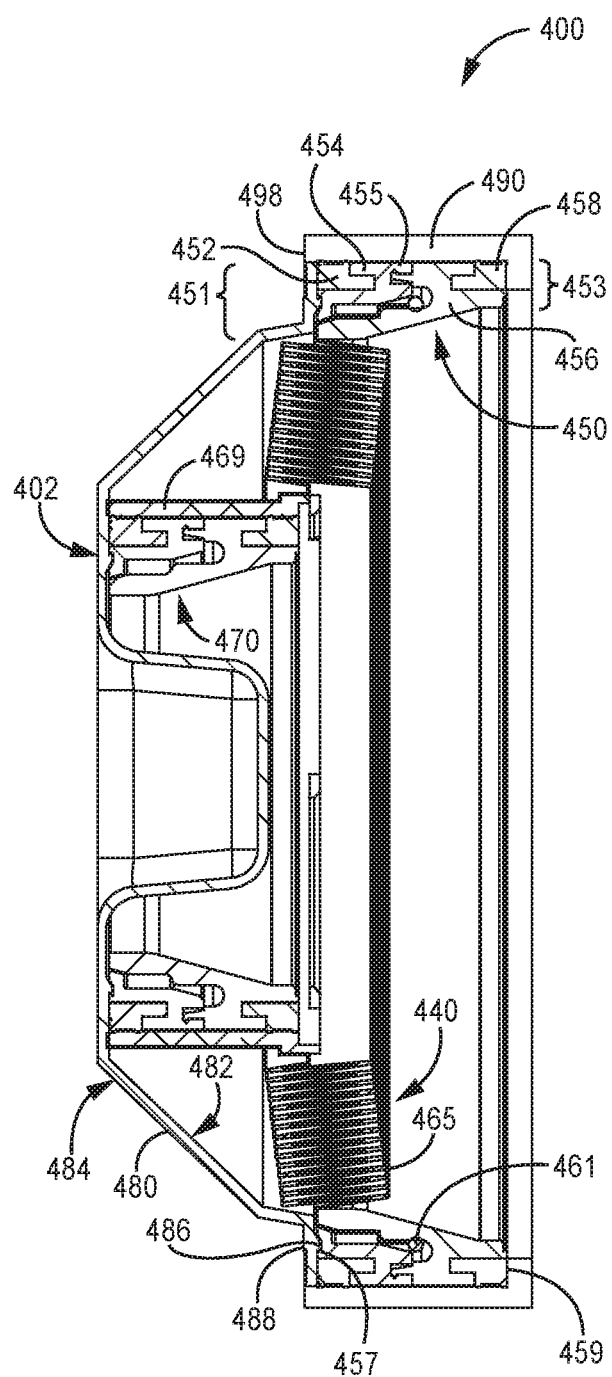
FIG. 8 is a cross-sectional view of a replacement glove assembly consistent with the technology disclosed herein.

FIG. 8 depicts an example replacement glove assembly 400. The replacement glove assembly 400 generally has a replacement access element 440, a replacement sealing assembly 450, a glove cap 480, and an outer sleeve 490. The replacement access element 440 is generally similar to the original access element 340 that is disposed in the annular port ring 300 (see FIG. 7). The replacement access element 440 has a replacement sleeve segment 465 defining an outermost shoulder end 461 that is sealably engaged by the replacement sealing assembly 450. The replacement sleeve segment 465 defines a cuff 469 at the opposite end of the outermost shoulder end 461 that sealably receives a replacement glove sealing element 470, which is sealably coupled to a glove (omitted for clarity).

The replacement glove sealing element 470 can be configured similarly to the glove sealing element 370 described with respect to FIG. 7. In particular, a replacement glove inner support ring 474 and a replacement glove outer support ring 476 can sealably engage an outermost shoulder end of a glove (not depicted). One or more replacement glove sealing gaskets 472, 478 are disposed in sealing contact with the an annular surface of the cuff 469 and the replacement glove inner support ring 474 and/or the replacement glove outer support ring 476 provide a seal between the glovebox and the environment outside of the glovebox. Alternate configurations are also possible.

The replacement sealing assembly 450 sealably engages the outermost shoulder end 461 of the replacement access element 440. The replacement sealing assembly 450 is configured to be sealably disposed in the annular port ring 300. The replacement sealing assembly 450 is sealably disposed in the outer sleeve 490. The replacement sealing assembly 450 has a leading radial face 451 defining a first coupling structure 457 and a trailing radial face 453 defining a second coupling structure 459. The first coupling structure 457 sealably engages the glove cap 480. The second coupling structure 459 is also configured to sealably engage the glove cap 480. Although alternate configurations are certainly contemplated, in the current embodiment the replacement sealing assembly 450 has a replacement inner support ring 454 and a replacement outer support ring 456 that sealably engage the outermost shoulder end 461 of the replacement access element 440. A replacement inner gasket 452 abuts the inner annular surface of the sleeve 490 and the leading face of the replacement inner support ring 454. A replacement outer gasket 458 abuts the inner annular surface of the sleeve 490 and the trailing face of the replacement outer support ring 456.

The glove cap 480 has a first side 482 and a second side 484. The first side 482 of the glove cap 480 defines a first mating structure 486 that sealably engages the first coupling structure 457 of the replacement sealing assembly 450. The second side 484 of the glove cap 480 defines a second mating structure 488 that is configured sealably engage the second coupling structure 459 of the replacement sealing assembly 450. The sides of the glove cap 480 can couple to their respective radial faces through a variety of mechanisms, as has been described above.

The outer sleeve 490 generally defines an opening that receives the replacement sealing assembly 450. The outer sleeve 490 is in sealing engagement with an outer annular surface 455 defined by the replacement sealing assembly 450. The replacement sealing assembly 450 and that outer sleeve 490 are generally mutually configured to allow linear translation of the replacement sealing assembly 450 from the outer sleeve 490. The outer sleeve 490 defines a leading radial face 498 that is configured to be at least partially inserted into the annular port ring 300, in multiple embodiments. The leading radial face 498 of the outer sleeve 490 is generally configured to interfere with the inner annular surface 306 of the annular port ring 300 such that the outer sleeve 490 is prevented from passing completely through the annular port ring 300. As was described above, the outer sleeve 490 is not present in all embodiments.

Figure 9:
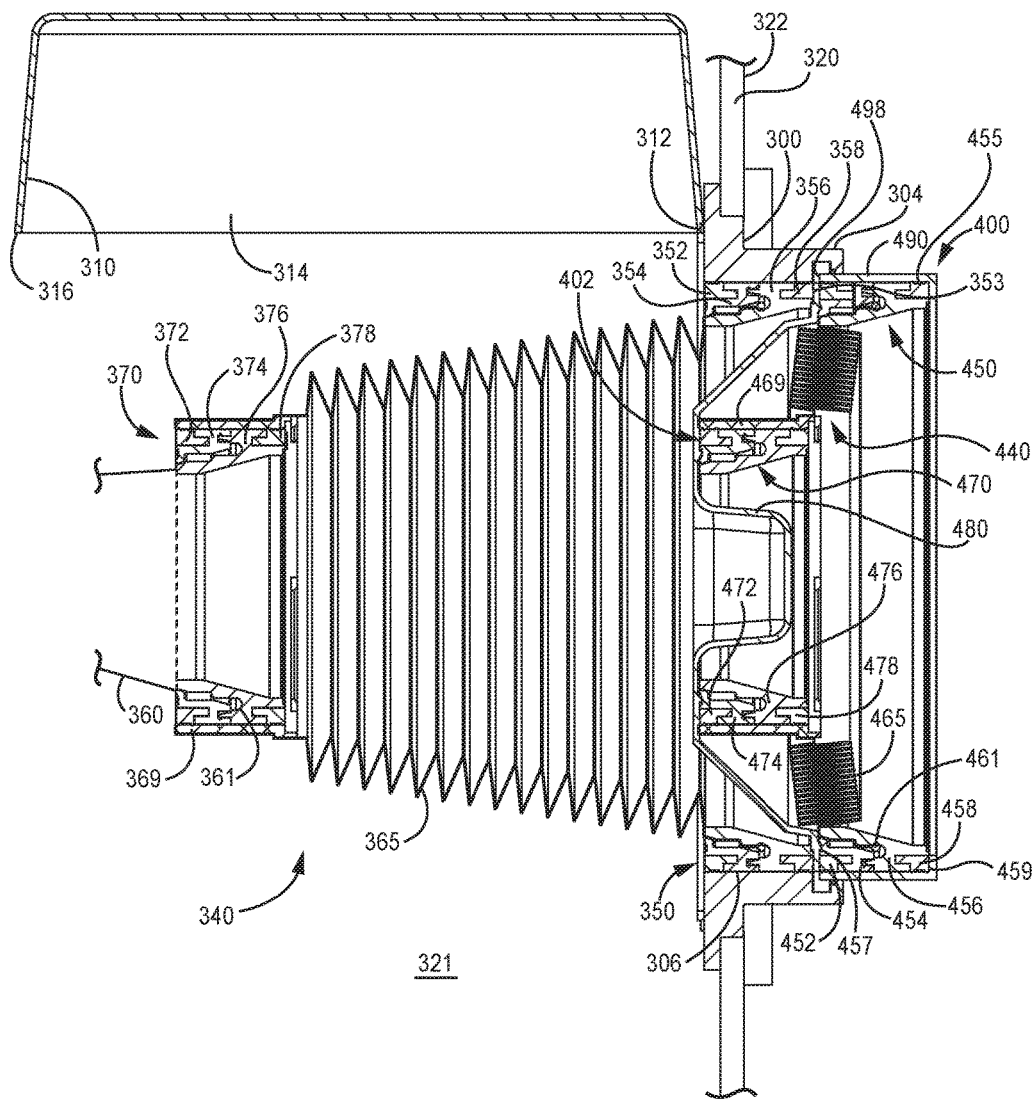
FIG. 9 is a cross-sectional view of a step associated with the configurations depicted in FIGS. 7 and 8.
Figure 10:
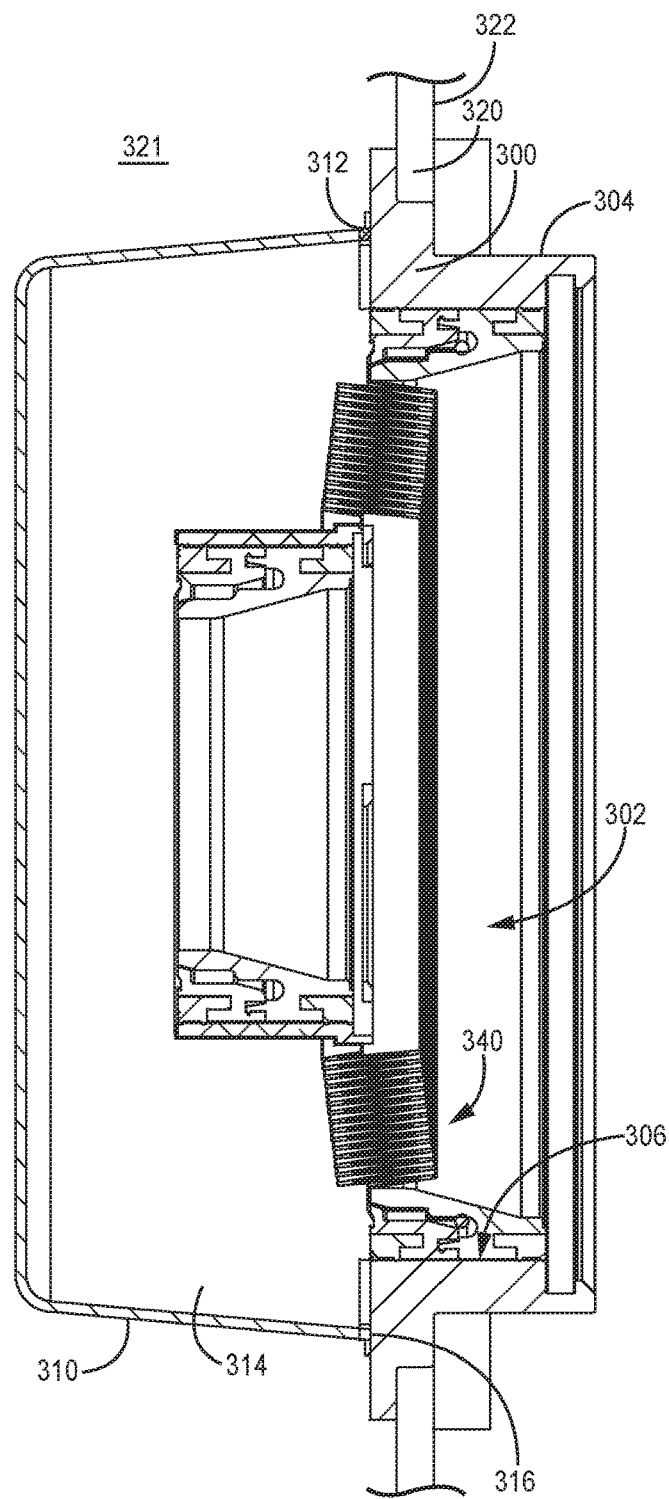
FIG. 10 is a cross-sectional view of the glove port consistent with FIG. 7 in an alternate configuration.

FIG. 9 depicts a step associated with installing a replacement access element 440 in the gloveport configuration of FIG. 7. The gloveport sealing assembly 350 having an access element 340, as depicted in FIG. 7, is disposed in an annular port ring 300 of a glove port. A leading face 402 of a replacement glove assembly 400 is aligned with a trailing radial face 353 defined by the gloveport sealing assembly 350 such that at least a portion of the leading face 402 abuts the trailing radial face 353. A substantial portion of the leading face 402 of the replacement glove assembly 400 is defined by a glove cap 480. It is noted that, in the currently depicted glove cap 480 configuration, when the glove cap 480 and the trailing radial face 353 of the gloveport sealing assembly 350 are aligned, some portions of the glove cap 480 extend beyond the trailing radial face 353 of the gloveport sealing assembly 350. Replacement of the original access element 340 and gloveport sealing assembly 350 with the replacement access element 440 and a replacement sealing assembly 450 will generally be similar to that described above with respect to FIGS. 3-6.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A method of replacing a glove, comprising:
   aligning a leading face of a replacement glove assembly with a trailing radial face of a gloveport sealing assembly disposed in an annular port ring of a glove port, wherein a substantial portion of the leading face of the replacement glove assembly is defined by a glove cap;
   pushing a replacement sealing assembly of the replacement glove assembly into the annular port ring, thereby translating the gloveport sealing assembly towards a glovebox and pushing the glove cap through the annular port ring;
   coupling the glove cap to the trailing radial face of the gloveport sealing assembly; and
   disconnecting the glove cap from the leading face of the replacement sealing assembly.

2. The method of claim 1, wherein pushing the replacement sealing assembly further comprising translating the replacement sealing assembly out from an outer sleeve of the replacement glove assembly.

3. The method of claim 1, wherein aligning the leading face of the replacement glove assembly comprises inserting a leading radial face of an outer sleeve of the replacement glove assembly into the annular port ring.

4. The method of claim 1, wherein the replacement sealing assembly engages an outermost shoulder end of an access element.

5. The method of claim 1, wherein pushing the replacement sealing assembly results in coupling the glove cap to the trailing radial face of the gloveport sealing assembly.

6. The method of claim 1, further comprising pushing the glove cap to disconnect it from the leading face of the replacement sealing assembly.

7. The method of claim 1 any of, further comprising rotating the glove cap relative to the replacement sealing assembly to disconnect it from the replacement sealing assembly.

8. The method of claim 1, wherein coupling the glove cap to the trailing radial face of the gloveport sealing assembly comprises rotating the glove cap relative to the gloveport sealing assembly.

* * * * *